(12) United States Patent
Kamat et al.

(10) Patent No.: US 7,837,099 B2
(45) Date of Patent: Nov. 23, 2010

(54) PARTNER ACCOUNT DEBIT PROCESS

(75) Inventors: Nandan Kamat, Hyderabad (IN);
Yogendra Joshi, Hyderabad (IN);
Ritabrata Bhattacharyya, Kolkata (IN);
Dheep Joy Mampilly, Aluva (IN);
Rajmohan Nair, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 1138 days.

(21) Appl. No.: 11/463,887

(22) Filed: Aug. 10, 2006

(65) Prior Publication Data

US 2008/0023541 A1 Jan. 31, 2008

(30) Foreign Application Priority Data

Jul. 27, 2006 (IN) ................. 1315/2006

(51) Int. Cl.
G06K 5/00 (2006.01)
(52) U.S. Cl. ............... 235/380; 235/379; 705/14.11
(58) Field of Classification Search .......... 235/380, 235/379; 705/16, 14.11, 14.27
See application file for complete search history.

(56) References Cited

U.S. PATENT DOCUMENTS

| 5,969,974 | A | 10/1999 | Vandenbelt et al. | |
|---|---|---|---|---|
| 6,138,911 | A | 10/2000 | Fredregill et al. | |
| 6,829,586 | B2 * | 12/2004 | Postrel | 705/14.14 |
| 7,099,803 | B1 | 8/2006 | Rappoport et al. | |
| 7,134,087 | B2 | 11/2006 | Bushold et al. | |
| 7,562,810 | B2 | 7/2009 | Rao et al. | |
| 2001/0037241 | A1 | 11/2001 | Puri | |
| 2001/0054003 | A1 | 12/2001 | Chien et al. | |
| 2002/0026248 | A1 | 2/2002 | Kaneko et al. | |
| 2002/0059103 | A1 | 5/2002 | Anderson et al. | |
| 2002/0065716 | A1 | 5/2002 | Kuschill | |
| 2002/0174011 | A1 | 11/2002 | Sanchez et al. | |
| 2003/0032474 | A1 | 2/2003 | Kaminkow | |
| 2003/0115100 | A1 * | 6/2003 | Teicher | 705/14 |
| 2003/0200141 | A1 | 10/2003 | Robison | |
| 2003/0225618 | A1 * | 12/2003 | Hessburg et al. | 705/14 |
| 2003/0225619 | A1 * | 12/2003 | Dokken et al. | 705/14 |
| 2003/0229522 | A1 | 12/2003 | Thompson et al. | |
| 2003/0229541 | A1 | 12/2003 | Randall et al. | |
| 2003/0236712 | A1 * | 12/2003 | Antonucci et al. | 705/26 |
| 2004/0098306 | A1 | 5/2004 | Fitzpatrick et al. | |
| 2005/0240472 | A1 | 10/2005 | Postrel | |

(Continued)

OTHER PUBLICATIONS

U.S. Appl. No. 11/463,889, filed Aug. 10, 2006, Office Action dated Mar. 8, 2010, 18 pages.

(Continued)

*Primary Examiner*—Seung H Lee
(74) *Attorney, Agent, or Firm*—Townsend and Townsend and Crew LLP

(57) ABSTRACT

A loyalty program business model includes entering into an agreement with loyalty program partners and agreeing on exchange rates between a variety of loyalty unit types. Partner accrual records (PAR's) are accepted from the loyalty program partners related to the business activity of related loyalty program members. Loyalty units credits are calculated for a member from data obtained in the step of accepting. A partner loyalty account balance is updated according to the standardized loyalty unit debit obtained in the step of calculating. Then an invoice can be billed to a partner according to the partner loyalty account balance.

9 Claims, 2 Drawing Sheets

U.S. PATENT DOCUMENTS

| | | | |
|---|---|---|---|
| 2005/0267800 | A1 | 12/2005 | Tietzen et al. |
| 2006/0031120 | A1 | 2/2006 | Roehr et al. |
| 2006/0111978 | A1 | 5/2006 | Tietzen et al. |
| 2006/0161478 | A1 | 7/2006 | Turner et al. |
| 2006/0178986 | A1 | 8/2006 | Giordano et al. |
| 2006/0248007 | A1 | 11/2006 | Hofer et al. |
| 2006/0253321 | A1 | 11/2006 | Heywood |
| 2008/0021772 | A1 | 1/2008 | Aloni et al. |
| 2008/0077498 | A1 | 3/2008 | Ariff et al. |
| 2008/0077499 | A1 | 3/2008 | Ariff et al. |

OTHER PUBLICATIONS

U.S. Appl. No. 11/463,888, filed Aug. 10, 2006, Office Action dated Nov. 26, 2008, 8 pages.

U.S. Appl. No. 11/463,888, filed Aug. 10, 2006, Final Office Action dated Jun. 17, 2009, 8 pages.

U.S. Appl. No. 11/463,888, filed Aug. 10, 2006, Advisory Action dated Sep. 14, 2009, 3 pages.

U.S. Appl. No. 11/463,888, filed Aug. 10, 2006, Office Action dated Jan. 6, 2010, 10 pages.

U.S. Appl. No. 11/463,885, filed Aug. 10, 2006, Office Action dated Apr. 1, 2008, 9 pages.

U.S. Appl. No. 11/463,885, filed Aug. 10, 2006, Final Office Action dated Oct. 22, 2008, 11 pages.

U.S. Appl. No. 11/463,885, filed Aug. 10, 2006, Advisory Action dated Jan. 13, 2009, 3 pages.

U.S. Appl. No. 11/463,885 filed Aug. 10, 2006, Notice of Allowance dated Mar. 20, 2009, 10 pages.

U.S. Appl. No. 11/463,879, filed Aug. 10, 2006, Office Action dated Jan. 23, 2009, 20 pages.

U.S. Appl. No. 11/463,879, filed Aug. 10, 2006, Final Office Action dated Aug. 18, 2009, 20 pages.

U.S. Appl. No. 11/463,879, filed Aug. 10, 2006, Adivsory Action dated Oct. 23, 2009, 3 pages.

U.S. Appl. No. 11/463,879, filed Aug. 10, 2006, Office Action dated Jan. 28, 2010, 17 pages.

* cited by examiner

PARTNER ACCOUNT DEBIT PROCESS

FIELD OF INVENTION

The present invention generally relates to a customer loyalty program and, in particular, to a method and system for partner account debit process.

BACKGROUND

Customer loyalty programs were introduced by airlines, hotels, and rental car companies to retain their existing customers as well as to attract new customers. In many of these programs, a customer earns loyalty units (generally regarded as Points, Miles, etc) for undertaking some activity (E.g. taking flights on host airline or a partner airline or a card partner). The loyalty units, which are earned in these programs, can be redeemed for various goods and services offered as awards. The principle of a loyalty program is to retain an existing customer base, as it is more expensive to bring in new customers than to retain existing ones.

The objective of these loyalty programs is to encourage customers to do more business with the loyalty program partners. The products and services offered by airlines, car rental companies, hotels, and the like, are all pretty much of generic nature. Accrual of loyalty units and the redemption of these loyalty units for rewards therefore form a significant differentiator.

Loyalty programs allow members to accrue in various types of loyalty units such as 'Frequent Flyer points', 'miles', status credits, etc. Financial accounting practices require that loyalty programs correctly calculate and represent liabilities for the member accruals.

Loyalty programs charge their partners for the member accruals to cover such liabilities. The partners pay the loyalty programs as they benefit by way of increased business from the members. Calculating receivables from the partners in monetary currency is conventionally based on a complex criteria involving (1) what was earned, e.g., the type of loyalty units earned such as miles, status credits, etc.; (2) who earned them, e.g., member characteristics such as in platinum tier, US citizen, etc.; and, (3) how they earned them, e.g., activity details such as flight taken from London to New York in business class, with Vision Airlines.

Conventional programs do not provide a seamless handshake between the member accruals and the billing to partners. Airlines total their partner account receivables manually, and those are often based solely on member accruals. What is needed is a partner account debit process for the systematic calculation of partner receivables based on member accruals and various member, partner and transaction attributes leveraging configurable loyalty rules framework.

SUMMARY OF THE INVENTION

Briefly, a partner account debit process business model embodiment of the present invention includes getting into an agreement with loyalty program partners on the pricing rules to work out a common base in a Partner Loyalty unit taking cognizance of the member accrual in different loyalty unit types and other transaction parameters. The partners then send the accrual transactions related to the business activity of loyalty program members. Loyalty program calculates the member accruals in various loyalty unit types and accrues them to the respective member accounts. A standardized loyalty unit debit is calculated for the partner from the accrual transaction data and the accruals to member accounts, in line with the partnership agreement. A partner loyalty account balance is then updated according to said standardized loyalty unit credit calculation. This in turn forms the basis for calculation of amount receivables from the partner.

An advantage of the present invention is that a partner account debit process is provided for end-to-end automation of accrual process.

Another advantage of the present invention is a method is provided for seamlessly linking member accruals and partner billing for operational efficiency and profitability.

These and other objects and advantages of the present invention will no doubt become obvious to those of ordinary skill in the art after having read the following detailed description of the preferred embodiments, which are illustrated in the various drawing figures.

DETAILED DESCRIPTION OF EMBODIMENTS

Figure 1:
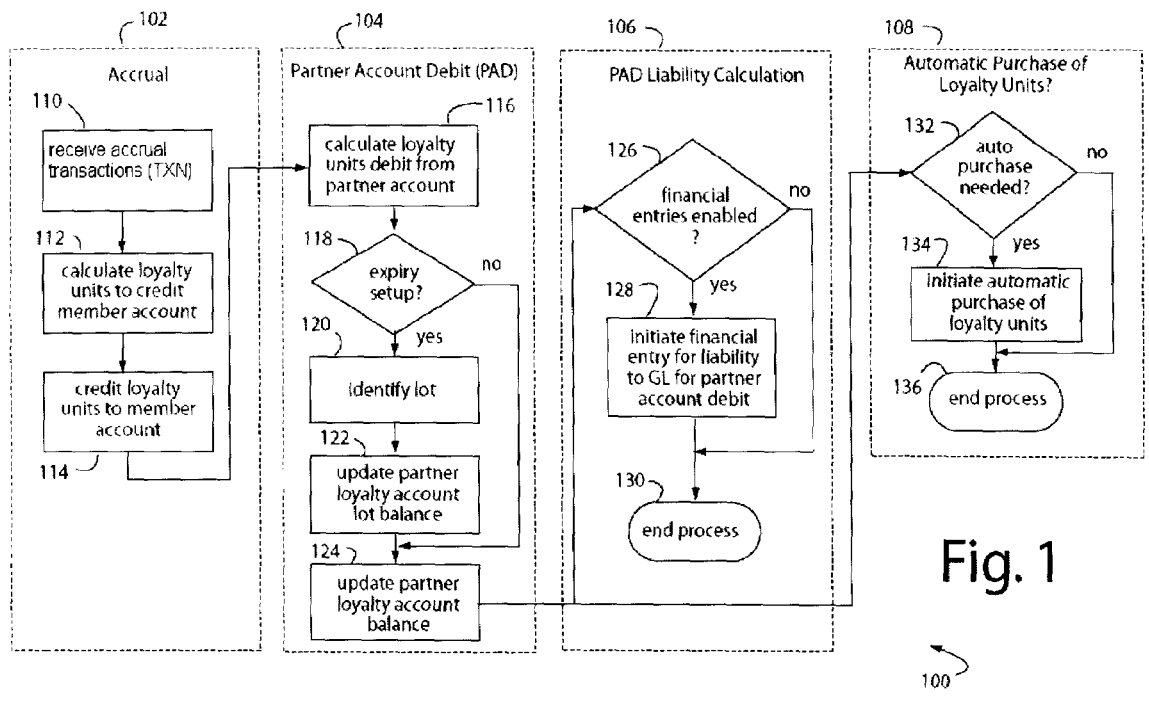
FIG. 1 is a flowchart diagram of partner account debit process embodiment of the present invention.

FIG. 1 represents a partner loyalty program business model embodiment of the present invention, and is referred to herein by the general reference numeral 100. The business model 100 comprises an accrual process 102, a partner account debit (PAD) process 104, a PAD liability calculation process 106, and an automatic purchase of loyalty units process 108.

The PAD process 104 uses a configurable rules framework. All the parameters are analyzed to arrive at a common base in partner loyalty units (PLU). This, in turn, forms a basis for a calculation of the accounts receivable corresponding to each loyalty program partner.

The accrual process 102 receives accrual transactions (TXN) in a step 110. A step 112 calculates the loyalty units in various loyalty unit types to be credited to the member. A step 114 then credits the calculated units to the member accounts.

The PAD process 104 calculates the loyalty units to debit from the respective partner's account. A step 118 check whether expiry date is setup for the partner. If so, a step 120 identifies the lot based on the earliest expiry date. A step 122 updates the partner loyalty account lot balance. Then a step 124 updates the partner loyalty account balance. The PAD liability calculation process 106 checks to see in a step 126 if financial entries are enabled for the loyalty program. If so, a step 128 initiates a liability financial entry to the general ledger (GL) for a loyalty program partner account debit. This branch then stops with an end-process step 130.

The automatic purchase of loyalty units process 108 checks if an automatic purchase of loyalty units is needed for the partner. If so, a step 134 initiates an automatic purchase of loyalty units. This branch then stops with an end-process step 136.

Agreements are worked out between partners and the loyalty program administration to determine the accruals to members for business activities undertaken with the partners. These agreements also define the rules to calculate partner account debit in a single Partner loyalty unit for the accruals to members in various loyalty unit types.

For example, an agreement between a loyalty program and an airline, Vision Air, could define the exchange rates between frequent flier points (FFP), status credits (SC), upgrade credits (UC), and partner loyalty units (PLU) according to Table I.

TABLE I 1.2 FFP = 1.0 PLU
1.0 SC = 3.0 PLU
1.0 UC = 10.0 PLU

The loyalty program and partner also agreed that there will be a 50% surcharge if the member is in the "platinum tier", a 30% surcharge if the member is employed by Federal Government, and a 100% surcharge if the member is a US citizen.

As an example of how business model 100 works, suppose a member with a United States (US) nationality is employed by the Federal Government and is enrolled in a "platinum tier". Such member takes a flight with Vision Air from Singapore to Los Angeles and is rewarded with 3000 frequent flier points (FFP), 200 status credits (SC), and 5 upgrade credits (UC) by a loyalty program. The PAD process 104 gathers all the transaction details, and works out a common base in partner loyalty units (PLU), e.g., (3000/1.2+200*3+5*10)*1.5*1.3*2=14175 PLU.

Partner accounts receivables are based on the rates defined as per agreement for PLU's in monetary currency, as agreed between the partner and the loyalty program, e.g., $0.02 per PLU, which would result in the example for partner receivables of $283.50

PAD process 104 is an intermediate step between member accrual 102 and partner billing 106, and provides a mechanism for systematic calculation of partner accounts debits based on complex criteria.

Such business model 100 enables an airline to charge a part of the member accruals to a partner who may not have been directly involved in the accrual transaction. For example, Sky Air is a sponsor of a loyalty program, and announces a package offering in which any member flying on any "oneworld Alliance" carrier to Los Angeles, staying in a Hilton Hotel, and buying a weekly ticket at Disney would get 10,000 bonus FFP's. Besides billing individual partners for regular accruals, e.g., oneworld Alliance carrier, Hilton and Disney, the loyalty program might want to bill the sponsor airline, Sky Air, for the bonus accrual.

Figure 2:
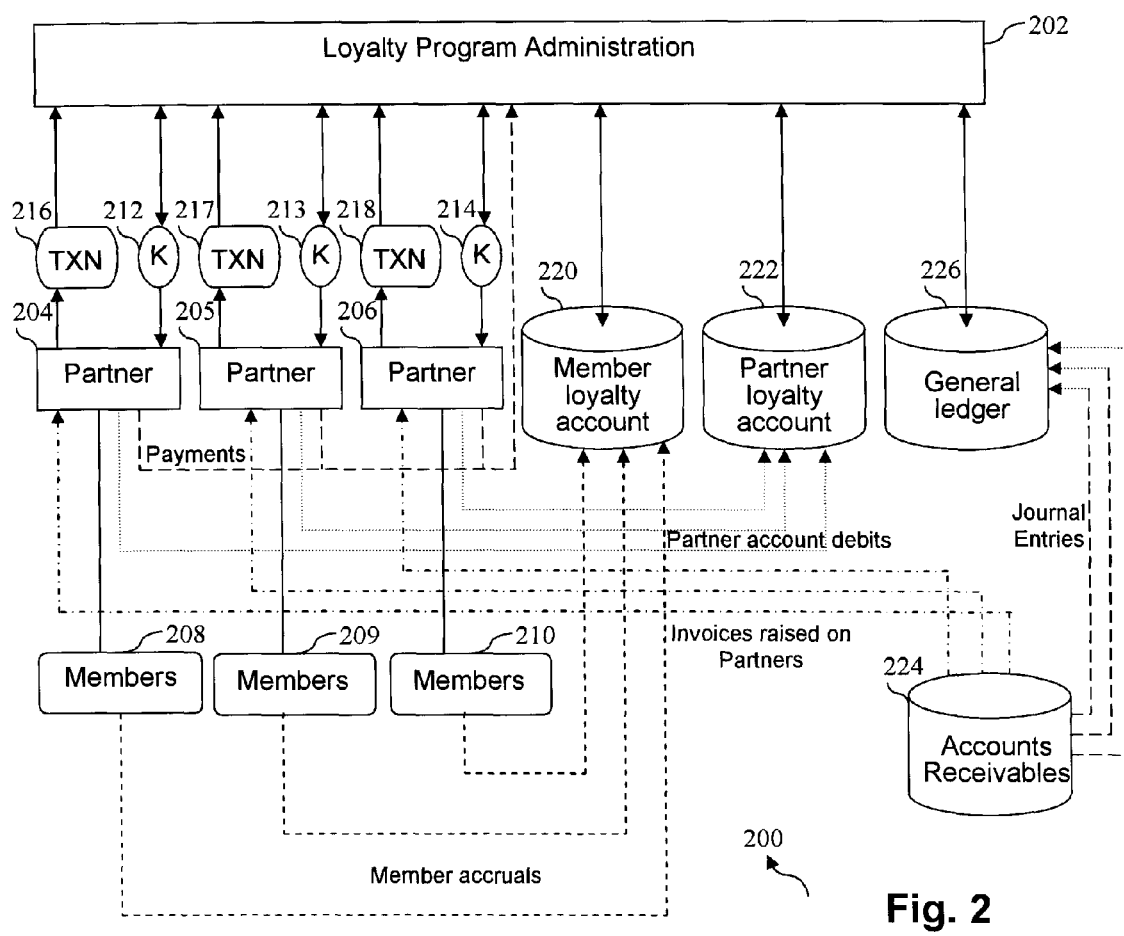
FIG. 2 is a functional block diagram of a loyalty program system for managing members, partners, and rewards, and that enables efficient and accurate financial accounting.

FIG. 2 represents a partner loyalty program system embodiment of the present invention, and is referred to herein by the general reference numeral 200. The system 200 includes a loyalty program administration 202 related to several partners 204-206. Each of these partners interfaces with loyalty program members 208-210 who accrue loyalty units and other member rewards for buying particular products and services of the partners. Such partners 204-206 make payments to the loyalty program administration 202 in response to the invoices raised by the loyalty program administration 202.

Each partner 204-206 signs an agreement (K) 212-214 with the loyalty program administration 202 that spells out PLU exchange rates as well as rules based on transaction attributes to ascertain the partner account debit and money equivalents of the debits. Members' (208-210) activity causes accrual transactions (TXN) 216-218 to be generated. Accrual transactions are received in a process like those described in FIG. 1. Member loyalty accounts 220 are updated for the accrual in various loyalty unit types, partner loyalty accounts 222 are used to update the partner account debits. A general ledger 226 is updated to reflect the liability incurred for the partner account debits. Accounts receivables 224 (partner financial accounts) are updated with the monetary amount equivalents of the partner account debits.

While the present invention has been described with reference to several particular example embodiments, those skilled in the art will recognize that many changes may be made thereto without departing from the spirit and scope of the present invention, which is set forth in the following claims.

The invention claimed is:

1. A partner account debit method, comprising:
entering into an agreement with loyalty program partners and agreeing on exchange rates or rules to determine the partner account debit in partner loyalty unit based on accruals to member in various loyalty unit types;
accepting accrual transactions from said loyalty program partners related to a particular business activity of related loyalty program members, and performing loyalty credits measured in different units from data obtained in the step of accepting, according to accrual rules agreed in the step of agreement;
calculating a standardized loyalty unit debit to a partner from data obtained in the step of accepting, according to said exchange rates or rules obtained in the step of agreement;
updating a partner loyalty account balance according to said standardized loyalty unit debit obtained in the step of calculating; and
billing a partner according to said partner loyalty account balance.

2. The method of claim 1, further comprising:
checking for an expiry date set for the partner; and
updating a partner loyalty account balance depending on results obtained in the step of checking.

3. The method of claim 1, further comprising:
calculating a partner account debit liability and initiating a financial entry for liability to a general ledger for said partner account debit.

4. A method of processing an accounts receivable, comprising:
collecting member business activity connected with a partner loyalty program;
converting each type of loyalty credit into standardized loyalty units according to a preexisting agreement of exchange values between a partner and loyalty program administration;
assigning a monetary value to each said standardized loyalty unit;
calculating a money-equivalent total from the standardized loyalty units debited to the partner; and
issuing an invoice to a respective partner according to the results obtained in the step of calculating.

5. A loyalty program system, comprising:
a loyalty program administrator;
at least one loyalty program partner with a plurality of loyalty program members;
an agreement between the loyalty program administrator and each loyalty program partner that defines the exchange rates or rules to be used in converting loyalty credits measured in different units into standardized loyalty units;
means for obtaining a series of accrual transactions from loyalty program partners related to the business activity of related loyalty program members;
means for converting each type of loyalty credit into standardized loyalty units according to said exchange rates between a partner and a loyalty program administrator;
means for assigning a monetary value to each said standardized loyalty unit;

means for calculating a money-equivalent total from said standardized loyalty units debited to the partners; and means for issuing an invoice to a respective partner according to the results obtained in the step of calculating.

6. The system of claim 5, further comprising:

member accounts associated with the loyalty program administrator, and providing for storage, access, and update of loyalty program member accounts.

7. The system of claim 5, further comprising:

a partner loyalty account associated with the loyalty program administrator, and providing for storage, access, and update of loyalty program partner loyalty accounts.

8. The system of claim 5, further comprising:

a financial system associated with the loyalty program administrator, and providing for storage, access, and update of partner receivables.

9. The system of claim 5, further comprising:

a general ledger associated with the loyalty program administrator, and providing for financial accounting of liability related to the loyalty units.

* * * * *

UNITED STATES PATENT AND TRADEMARK OFFICE
CERTIFICATE OF CORRECTION

PATENT NO.        : 7,837,099 B2                                    Page 1 of 1
APPLICATION NO.   : 11/463887
DATED             : November 23, 2010
INVENTOR(S)       : Nandan Kamat et al.

It is certified that error appears in the above-identified patent and that said Letters Patent is hereby corrected as shown below:

On the first page, in field (30), in column 1, under "Foreign Application Priority Data", line 1, delete "1315/2006" and insert -- 1315/CHE/2006 --, therefor.

On the first page, in field (57), in column 2, in "Abstract", line 4, delete "arc" and insert -- are --, therefor.

On page 2, in column 2, under "Other Publications", line 15, delete "Adivsory" and insert -- Advisory --, therefor.

Signed and Sealed this
Second Day of August, 2011

David J. Kappos
*Director of the United States Patent and Trademark Office*